United States Patent [19]

Sieradzki et al.

[11] Patent Number: 4,977,038
[45] Date of Patent: Dec. 11, 1990

[54] MICRO- AND NANO-POROUS METALLIC STRUCTURES

[76] Inventors: Karl Sieradzki, 3703 Gardenview Rd., Baltimore, Md. 21208; Roger C. Newman, 2 Moss Lane, Alderley Edge, Cheshire, SK9 7HN, England

[21] Appl. No.: 338,260

[22] Filed: Apr. 14, 1989

[51] Int. Cl.[5] ............................ B32B 5/18; C25F 3/14
[52] U.S. Cl. .................................... 428/610; 428/613; 204/129.1; 204/140
[58] Field of Search ..................... 204/140, 129.1, 32.1, 204/129.75; 428/613, 610

[56] References Cited

U.S. PATENT DOCUMENTS

| | | | |
|---|---|---|---|
| 2,837,473 | 6/1958 | MacCormack et al. | 204/140 |
| 3,190,749 | 6/1965 | Fleming | 428/613 |
| 3,245,764 | 4/1966 | Plante | 428/613 |
| 3,352,769 | 11/1967 | Ruben | 428/613 |
| 3,405,011 | 10/1968 | Caprioglio | 428/613 |
| 3,429,751 | 2/1969 | Kronberg | 428/613 |
| 3,434,827 | 3/1969 | Lemkey | 428/613 |
| 3,594,292 | 7/1971 | Russell et al. | 428/613 |
| 3,890,209 | 6/1975 | Shigeta et al. | 428/613 |
| 4,292,208 | 9/1981 | Baldi et al. | 428/613 |
| 4,608,314 | 8/1986 | Croopnick et al. | 428/613 |
| 4,717,455 | 1/1988 | Texton et al. | 204/129.75 |
| 4,812,236 | 3/1989 | Ehrsom | 428/613 |

FOREIGN PATENT DOCUMENTS

| | | | |
|---|---|---|---|
| 3125975 | 1/1983 | Fed. Rep. of Germany | 204/129.1 |
| 49-42779 | 11/1974 | Japan | 204/129.1 |
| 57-109242 | 7/1982 | Japan | 428/613 |
| 60-59063 | 4/1985 | Japan | 204/32.1 |
| 230106 | 2/1969 | U.S.S.R. | 204/129.1 |

OTHER PUBLICATIONS

Forty, A. J. and Durkin, P., "A micromorphological study of the dissolution of silver-gold alloys in nitric acid", *Philosophical Magazine A*, vol. 42, No. 3, (1980), pp. 295-318.

Primary Examiner—John J. Zimmerman
Attorney, Agent, or Firm—Cushman, Darby and Cushman

[57] ABSTRACT

Micro- and nano-porous metal structures including an alloy of one or more noble metals and substantially uniform and interconnected porosity in pore sizes ranging from three nanometers to 10 micrometers produced by a process including the following steps: mixing at least two metals having different electrochemical activity, according to predetermined proportions to form a multi-metallic alloy; contacting said alloy with an electrolyte; and applying an electrochemical potential to said electrolyte wherein said alloy acts as the anode until all or a portion of the more electrochemically active metal is dissolved from the alloy leaving porous metal.

36 Claims, 4 Drawing Sheets

MICRO- AND NANO-POROUS METALLIC STRUCTURES

BACKGROUND AND SUMMARY OF THE INVENTION

The present invention relates to certain porous metallic structures and processes for making same. The invention particularly relates to metallic structures having very small pore sizes being of uniform and interconnected porosity. The porous metallic structures have utility, for example, as metal membranes or filters.

Broadly described, the porous metallic structures are produced by mixing at least two metals having significantly different electrochemical activities, according to predetermined proportions, to form a multi-metallic alloy; contacting the alloy with an electrolyte; and applying an electrochemical potential between the metal and the electrolyte wherein the alloy acts as an anode until all or a portion of the more electrochemically active metal is dissolved from the alloy leaving porous metal. The porous metal in another embodiment of the present invention is heat annealed i.e. coarsened to increase the pore size and mechanical stability of the porous metal. The structures are produced with uniform porosity in pore sizes ranging from about 3 nanometers to 10 micrometers. The porous structure can be produced in thicknesses ranging from 0.0001 to 10 mm. Depending upon the elemental composition of the membrane, the volume fraction of porosity attainable in the structures ranges from 30–80% and all of the porosity is substantially all interconnected. Membranes prepared in this way are mechanically tough, chemically inert, and heat resistant (e.g. thermally sterilizable). Such a membrane may be employed as a filter to separate particles, of size down to the molecular level, from gases and liquids.

BRIEF DESCRIPTION OF THE DRAWINGS

Further objects and advantages of the present invention will be better understood by carefully reading the following detailed description of the presently preferred exemplary embodiments of this invention in conjunction with the accompanying drawings, of which.

DESCRIPTION OF THE INVENTION

Figure 1:
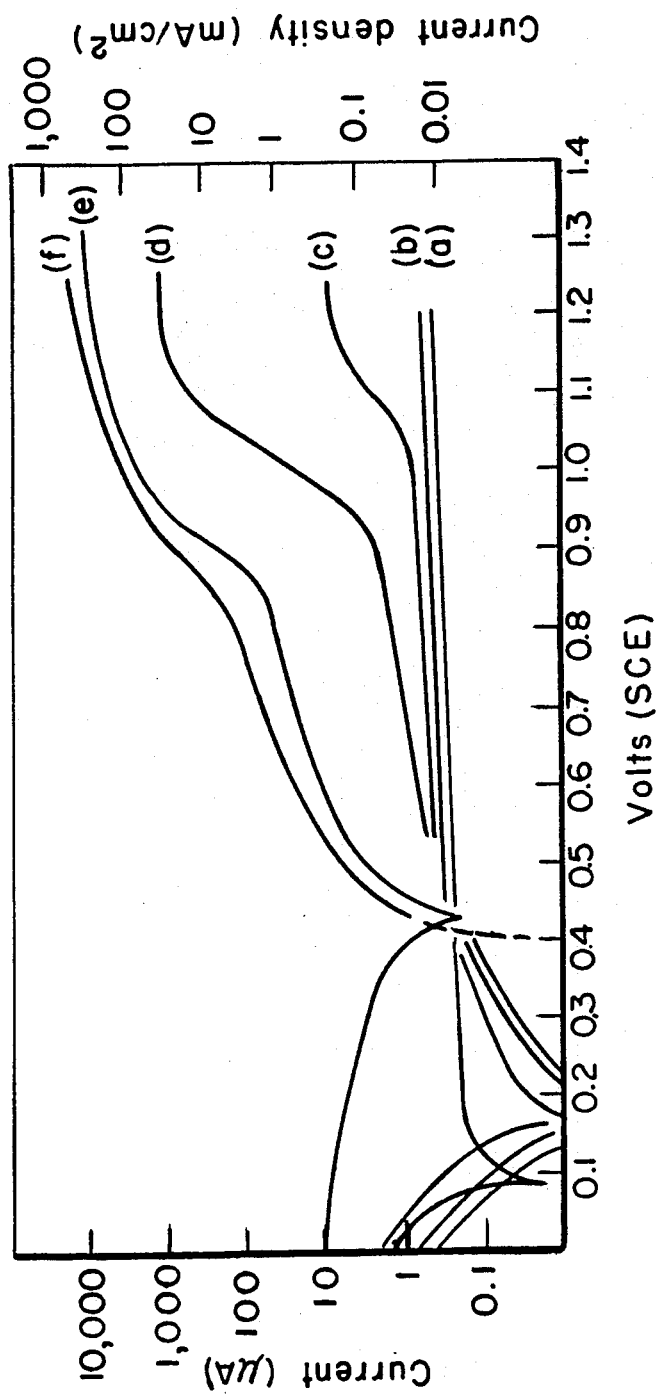
FIG. 1 shows polarization curves of Ag-Au alloys in 1 M perchloric acid. (a) pure Au (b) $Ag_{0.50}Au_{0.50}$ (c) $Ag_{0.60}Au_{0.40}$ (d) $Ag_{0.70}Au_{0.30}$ (e) $Ag_{0.74}Au_{0.26}$ (f) $Ag_{0.80}Au_{0.20}$.

The porous metal structures are produced starting with an alloy of prescribed composition using a combination of electrochemical and thermal treatments. The starting composition of the alloy determines the volume fraction of porosity and the minimum pore size available from the particular alloy. The starting composition is determined using a scheme based upon percolation theory. The alloy is composed of elemental metals of prescribed composition with a large difference in electrochemical activity. The relative electrochemical activities of the elements are determined by the difference in the thermodynamic equilibrium metal/metal ion electrode potentials, $\Delta E°$, as given by the electromotive force series of standard reduction potentials. By the application of an appropriate electrochemical potential in a suitable electrolyte the reactive element is selectively dissolved out while leaving the more noble element in the form of a sponge or membrane retaining the initial shape and dimensions of the sample. This allows the shape of the membrane to be pre-machined prior to the corrosion and thermal treatments as discussed below. Depending upon the system, the dissolution process may take place at various temperatures.

For a particular alloy system the "dealloying threshold, $p^*$," is defined based upon the difference in the equilibrium metal/metal ion electron potentials of the elements in the alloy. The $p^*$ defines the minimum possible concentration of the reactive element in the alloy necessary for forming the porous membrane from the remaining noble-metal and is determined from percolation theory in the following way. For elements in a binary alloy with a $\Delta E°$ greater than about 0.3 Volt and less than about 1.0 Volt, selective corrosion of the more reactive element can only proceed by a two-dimensional percolation process. This requires a minimum composition of the more reactive element of Ca. 60% atomic fraction (at %). For elements in a binary alloy with a $\Delta E°$ of 1.0 volt or greater, selective corrosion of the more reactive element proceeds by a three-dimension percolation process which allows for a minimum composition of the more reactive element of ca.30 at %. The atomic concentration of reactive element determines the volume fraction of porosity achievable in the membrane and the process of the present invention enables a volume fraction range of 30–80%. Thus, the metal to be removed comprises 30–80% of the binary alloy depending on the $\Delta E°$ of the alloy. The 80% upper limit is a result of the requirement that the remaining noble porous metal be able to span the geometry or shape of the structure. For starting compositions greater than 80 at % of reactive element the remaining porous metal cannot maintain the initial shape of the structure and collapses. The electrolyte is chosen such that it has high solubility for the dissolved reactive metal component. The electrochemical potential is chosen to be equal to (or as close to, as allowed for by the electrolyte) the equilibrium metal/metal ion electrode potential of the more noble metal element comprising the alloy, assuming a metal ion concentration of ca.$10^{-6}$ M.

Metal removal by the corrosion procedure is in one embodiment of the invention, carried out to a prescribed depth as a fraction of the sample thickness, resulting in porosity to that depth.

The porous metallic structure resulting from the corrosion process, may be reinforced by two additional procedures. The resulting porous structure may be reinforced by applying i.e. lacquering a tightly adhering material impermeable to the electrolyte to selected areas of the initial alloy before contacting the alloy with the electrolyte and initiating the corrosion procedure. This prevents subsequent dissolution of the reactive metal component (e.g. silver in a silver-gold system) from the covered areas. The undissolved metal i.e. original solid, ductile alloy, is present between the dissolved regions thus providing structural support to the membrane. The solid portions of the porous structure allow for clamping and support of the structure in applications.

Another method for structurally supporting the porous metallic membrane resulting from the corrosion process, is to place a metal (e.g. copper) macroscopic mesh or other design on all or a portion of the surface of the porous metallic structure. The reinforcing material forms a composite structure providing great structural integrity.

In an embodiment of the present invention, after the corrosion procedure the resulting porous metallic structure may be subjected to heat annealing (coarsening) to increase the pore size, mechanical stability, and ductility of the structure. The unannealed structure is typically placed in a furnace for annealing.

Placing the unannealed structure directly (optionally, first rinsing the sample) into the furnace at an elevated temperature for porosity coarsening often led to sample shape distortion or warping. The warping results from the inhomogeneous temperature distribution in the structure as the structure heats up, i.e., the structure heats up from the outside in. As a result, the porous structure undergoes coarsening first near its surfaces and then in its interior. The resultant surface stresses can act to distort the sample.

Two solutions to this problem were developed and are embodiments of the present invention. The first involves the use of a rigid metal jacket cast which surrounds the structure and forces the structure to maintain its original shape. The cast is designed so that it is an adjustable stainless steel jacket which snugly surrounds the structure. A sample placed in such a jacket retained its original shape and dimensions during annealing at the desired temperature, in the furnace. The desired temperature ranges from 100°–800° C.

The other solution relies on the use of a temperature programmable furnace or similarly temperature controlled furnace. The unannealed sample is placed in the furnace at ambient temperature and the temperature is ramped (increased) linearly at a rate of less than 10° C. min$^{-1}$ until the desired temperature is attained. The desired temperature range is from 100°–800° C. This procedure is procedure involving the cast where the unannealed structure is placed in the furnace at the aforementioned prescribed elevated temperature, for a prescribed time interval.

For both procedures, the time interval for continuously maintaining the prescribed temperature ranges from 2 minutes to one hour and preferably 5–30 minutes.

Both procedures can be used simultaneously to provide even less shape distortion.

For all annealing, including in-situ annealing discussed below, the mean pore size $<l>$ varies with time, at constant temperature, proportional to time $t^{(0.25-0.35)}$ (preferably, $t^{(0.30)}$) i.e. $\alpha t^{(.025-0.35)}$.

In one embodiment of the present invention, the annealed porous metallic structure may be reinforced with a metal (e.g. copper) macroscopic mesh or other design placed on the surface of the porous structure to provide greater structural support. The macroscopic mesh forms a composite like structure providing great structural integrity.

In another embodiment of the present invention, a step change in the porosity of the porous metallic structure is achieved in the following manner. Corrosion (de-alloying) is carried out to a prescribed depth which is some fraction of the sample thickness. Following this procedure, the sample is heat annealed according to the previously described procedures. The sample is removed from the furnace and once again subjected to corrosion for a prescribed period of time. A corrosion cell is employed which can be evacuated. The cell is evacuated after the membrane is placed back into the cell. The electrolyte is introduced into the cell under vacuum contacting the porous structure. This facilitates penetration of the electrolyte into the porous structure. A fine porous sponge forms at the interface of the coarse annealed porous structure and uncorroded metal. Once again the sample is placed into the furnace, but annealed at a temperature lower than the first anneal. This allows the initial coarse structure to remain stable during the second anneal. The sample is removed and placed into the corrosion cell for further de-alloying. Again the annealing procedure is repeated at yet a lower temperature and a third layer of porosity is formed. The entire procedure may be repeated again and again thus forming a de-alloyed membrane of prescribed total thickness with step changes in porosity.

The present invention is further illustrated by the following example:

EXAMPLE

The processes of the present invention were employed for the production of the porous metallic structures of the invention, for example, nano- and microporous gold metal membranes as follows: The membranes were made from a silver-gold (Ag-Au) alloy. The $\Delta E°$ for this system was about 0.7 Volt so that the de-alloying (i.e. removal of Ag) process occurs via a two-dimensional spiral process. Silver is the more reactive element and so a minimum concentration of 60 at % Ag was required in the alloy in order to produce porous gold. A 1 M perchloric acid electrolyte was employed owing to the high solubility of silver in this solution. Various concentrations of perchloric acid were tested ranging from 0.01 M to 4 M. Other than perchloric acid, nitric acid was also tested and found to be an appropriate electrolyte. Perchloric acid was found to be more useful in that there was a direct correlation between the quantity of Ag removed from the alloy and the total anodic charge measured as the integral of the current-time plot. The anodic current provided a direct measure of the number of Ag atoms removed every second. Since silver dissolves as $Ag^+$, each dissolving Ag atom is responsible for a charge of c.a. $1.6 \times 10^{-19}$ coul. The current was directly measured using the ammeter of the potentiostat. The current density is the current divided by the exposed area of the sample which is dissolving. A very high conductivity electrolyte was employed in order to lessen iR (voltage) drops down the microporous channels. The voltage drop greatly reduces the kinetics of the de-alloying process and can considerably lengthen the time required to obtain the porous solid. A 1 M perchloric acid concentration was used because it represents a good balance between the high conductivity requirement and safety, i.e., perchloric acid can be an explosive mixture in concentrations between 4–10 M at elevated temperatures. The employed electrochemical potential varied between 0.7 Volt and 14 Volt with respect to a saturated calomel electrode (SCE). The optimal voltage vis-a-vis efficiency was ca. 1.1 Volt (SCE), as shown in FIG. 1.

The Ag-Au alloys were melted in the form of 1 cm. rods or ingots under vacuum using standard procedures. The ingots were furnace cooled and then swaged so that the rod diameter was reduced by approximately 10%. Following this cold working, the alloys were placed in a furnace under vacuum and annealed at 900° C. for 120 hrs. This procedure substantially removed the dendritic microstructure initially present in the as cast material, which while not necessary, provided more uniform strength of the resulting porous structure.

The behavior of Ag-Au alloys was examined in the range of compositions of 10-90 at % Ag and it was determined that the optimum composition range for gold membrane and sponge (generally, porous structure) production was 60-80 at % Ag. These results are in agreement with the previously discussed percolation model of de-alloying developed by the present inventors. FIG. 1 shows polarization curves for selected compositions in the range examined and demonstrates the significant alteration in behavior which occurs near 60 at % Ag. For alloy compositions containing less than ca. 60 at % Ag, the alloy polarization curve is similar to the polarization curve for pure gold. For alloy compositions with the Ag content greater than 60 at %, the current density rises significantly above the 0.01 mA-$cm^2$ level which is characteristic of pure gold and lower (<60 at %) silver containing alloys in the perchloric acid electrolyte. Note that the sustained plateau current (at c.a. 1.1 V (SCE)) of the alloys does not simply scale with the silver concentration in the alloy. This is due to the fact that the selective corrosion of silver occurs by a percolation like process. The size of the porosity that develops from the silver removal controls the rate of the subsequent silver removal and is a function of the starting silver content in the alloy. The lower the initial silver content the smaller the porosity which develops in the as-corroded structure. Fine porosities will slow down the kinetics of mass transport in the electrolyte and increase iR (voltage) drops within the pores and these effects greatly reduce the kinetics of the de-alloying process. In general within the 60-80 at % Ag range, lower silver contents led to finer porosities in the as-corroded structure which slowed the kinetics of the de-alloying process. Near 60 at % Ag, the de-alloying process was extremely slow with sustained currents in the range of 0.1-1.0 mA-$cm^2$. These current densities were not conducive for the production of thick (>100 μm) membranes. At the other extreme, the selective dissolution of the 80 at % Ag containing alloy resulted in gold porous structures which were extremely fragile in the as-corroded state. Scanning electron microscopy showed that numerous cracks can develop in gold porous structures produced from alloys close to this composition.

In general, it was found that compositions close to 60 at % Ag were best for the thin (<10 μm) fine porosity (10 nm) membranes and that compositions close to but less than 80 at % Ag were best for the production of thick membranes of large average porosity (about 10 um).

An optimal composition was found for which a large variety of very stable porous gold membranes could be produced. This composition is $Ag_{0.74}Au_{0.26}$ and this alloy polarization curve is shown in FIG. 1. Samples of this composition could be machined prior to the corrosion procedure into any prescribed shape (e.g., cylindrical, disc, etc.,) which maintained very close tolerances during the production of the membrane.

Figure 2:
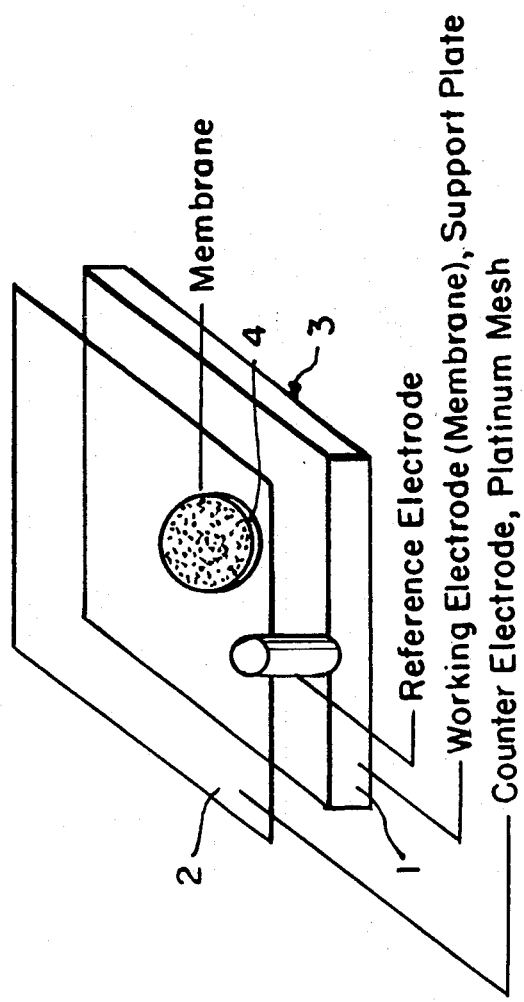
FIG. 2 shows the electrochemical cell configuration for membrane production.
Figure 3:
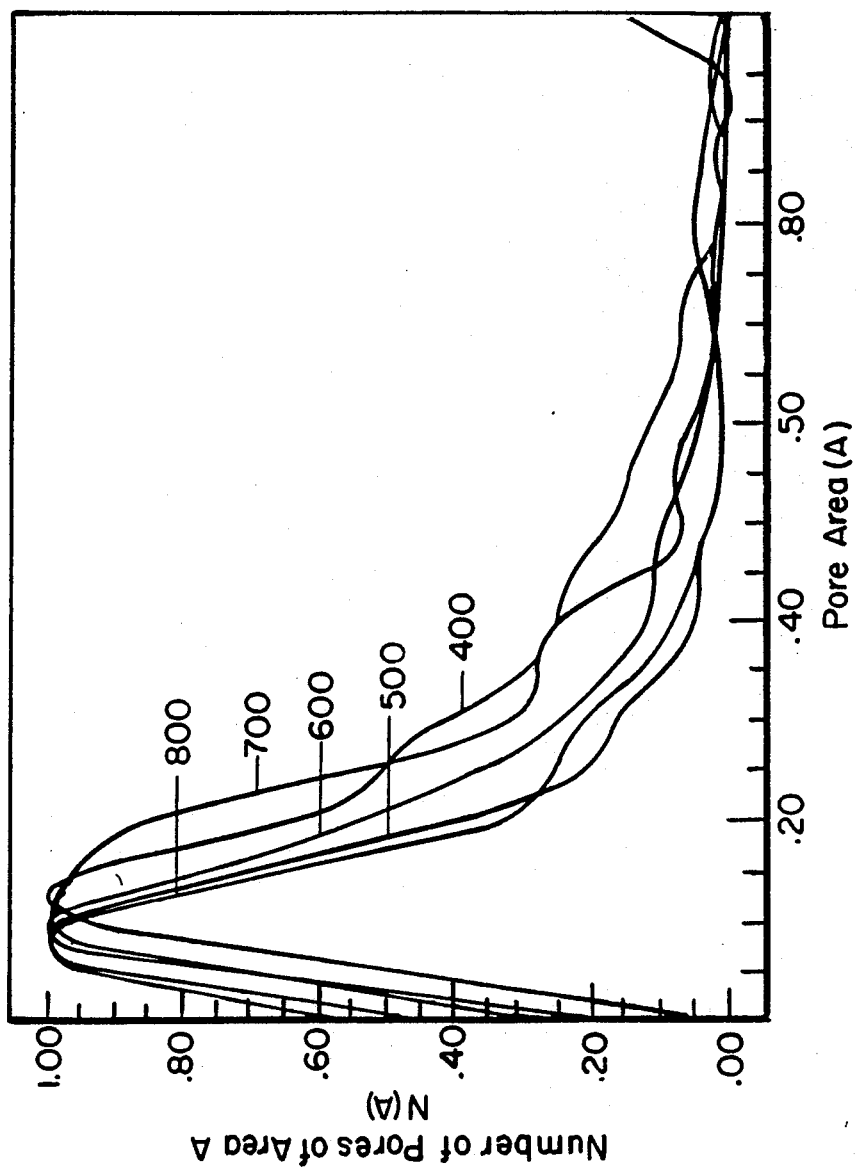
FIG. 3 shows curves for the normalized pore size distribution for $Ag_{0.74}Au_{0.26}$ alloy annealed 10 minutes at the indicated temperatures. The pore size area, A, was normalized using the maximum pore area which developed at each of the annealing temperatures, $A_{max}$(temp.). These parameters are, $A_{max}(800)=2.45$ $\mu m^2$, $A_{max}(700)=0.95$ $\mu m^2$, $A_{max}(600)=0.55$ $\mu m^2$, $A_{max}(500)=0.28$ $\mu m^2$, and $A_{max}(400)=0.24$ $\mu m^2$.

Various electrode configurations were examined for mechanical stability, i.e., a corroded (at 25° C.) unsupported gold sponge was very susceptible to collapse under its own weight. It was determined that supporting the Ag-Au electrode on a large mechanically stiff very flat metal sheet (3), as shown in FIG. 2, made of platinum or another stable metal which serves as part of the working electrode, completely eliminated the problem of poor mechanical stability. The electrochemical cell configuration is shown in FIG. 2. Structural support of the membrane during the corrosion process was found to benefit stability.

It was found that in-situ annealing can be accomplished by performing the de-alloying at about 50°-90° C. and preferably 90° C. In-situ annealing increased the as-corroded ductility of the resulting porous structures. Moreover, insitu annealing enabled the manufacture of membranes with geometries other than planar which were stable mechanically.

The $Ag_{0.74}Au_{0.26}$ electrode (1) was configured for de-alloying as shown in FIG. 2., in a 1.0 M perchloric acid electrolyte. The $Ag_{0.74}Au_{0.26}$ alloy was placed on the support plate which was connected as the working electrode to a potentiostat. The counterelectrode (2) material in this configuration was platinum but any suitable metal (e.g. stainless steel) or graphite would serve equally well. The electrochemical potential was set at c.a. 1.1 Volt (SCE) and maintained at that potential until the anodic current density dropped below the level of 10 microamps-$cm^{-2}$. At this current density the anode composition was >99% gold forming porous structure (4). This procedure was performed at temperatures in the range 10°-90° C. to form membranes (depending upon the desired characteristics of the membrane). Following the de-alloying treatment, the anode, now composed of nanoporous gold, can be transferred to a temperature controlled furnace for the annealing (coarsening) procedure.

Membranes of dimensions 10 mm × 10 mm × 1.5 mm thick were fabricated from an ingot of $Ag_{0.74}Au_{0.26}$ alloy using the ambient temperature selective corrosion process described above. Subsequent samples were encapsulated in a cast stainless steel jacket and inserted into the annealing furnace at a prescribed temperature for a time of 10 minutes. The resultant membrane characteristics are listed in the table below.

TABLE

Characteristics of membranes manufactured from a $Ag_{0.74}Au_{0.26}$ alloy. The Table below lists the resulting characteristics of the membranes obtained. The abbreviations in the table refer to the following: E, the elastic Young's modulus of the membrane; S the fracture stress; <1>, the average pore size of the membrane; and A, the average pore area;

| Temp(°C.) | A(μm²) | <1>(μm) | E(MPa) | S(MPa) |
|---|---|---|---|---|
| 25 (room temp.) | 6 × 10⁻⁶ | 0.002* | ** | ** |
| 100 | 2.5 × 10⁻⁵ | 0.005 | 240 | 0.55 |
| 200 | 0.0004 | 0.02 | 190 | 0.65 |
| 300 | 0.002 | 0.04 | 160 | 0.80 |
| 400 | 0.01 | 0.10 | 100 | 1.10 |
| 500 | 0.02 | 0.14 | 100 | 1.30 |
| 600 | 0.07 | 0.26 | 97 | 1.45 |
| 700 | 0.20 | 0.44 | 55 | 1.50 |
| 800 | 1.53 | 1.25 | 47 | 3.00 |

*Estimated by linear extrapolation
**Not determined

The void size distributions for the samples annealed at 800°, 700°, 600°, 500°, and 400° C. are shown in FIG.

Figure 4:
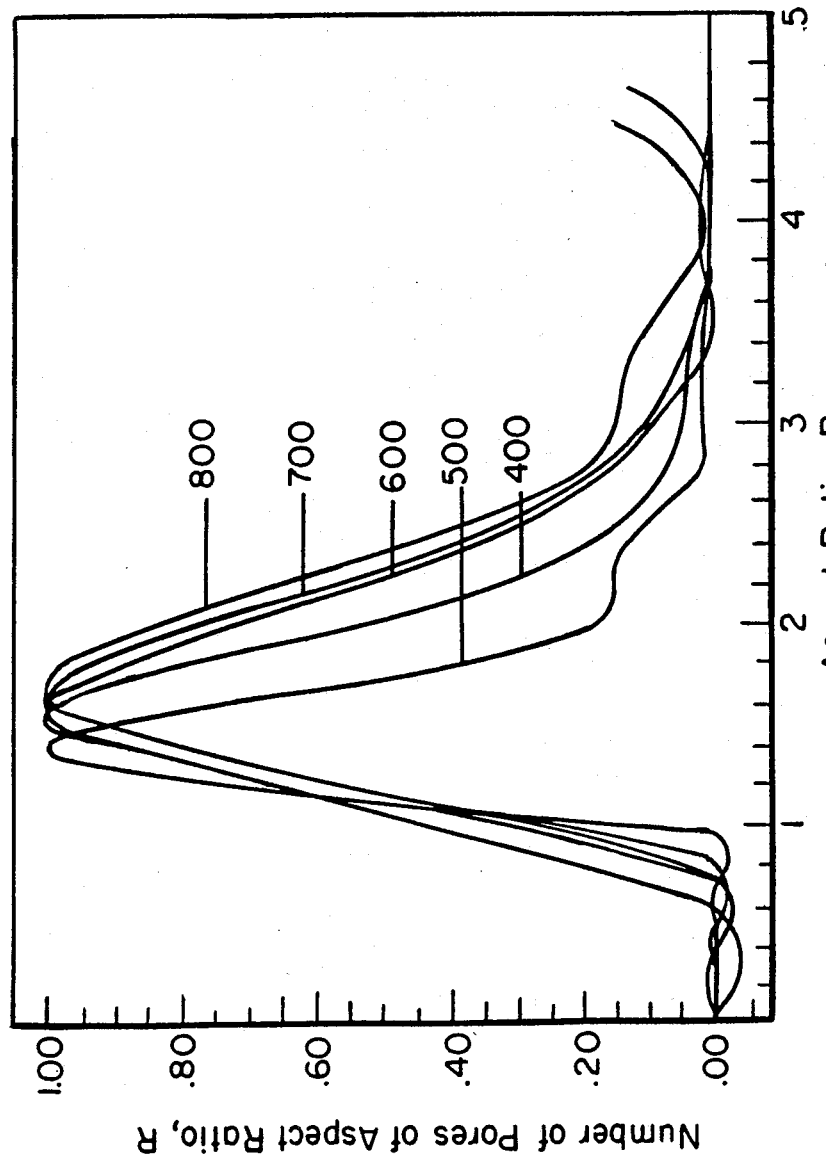
FIG. 4 shows curves for normalized pore aspect ratio distribution for $Ag_{0.74}Au_{0.26}$ alloy annealed 10 minutes at the indicated temperatures.

3, and the aspect ratio distributions for these samples are shown in FIG. 4. The distributions almost superpose on one another indicating the self-similar nature of the coarsening process operative during annealing. Thus the uniformity of the pore size is assured within the range of temperatures examined.

The mechanical properties of the membranes are listed in the table above. In general the smaller pore size membranes have a larger Young's modulus and a smaller fracture stress than the larger pore size membranes. It was also determined that the toughness or ductility of the membrane was a function of the ratio of the membrane thickness, W, to the average pore size. For membranes with $W/<l>$ less than 10,000 the membranes were tough and ductile, while for membranes with $W/<l>$ significantly greater than 10,000 the membranes were brittle. It was found that the very small pore size membranes can be toughened or ductilized by decreasing the thickness of the membranes such that the value of $W/<l>$ is less than 10,000.

While only a few exemplary embodiments of the present invention have been described in detail, those skilled in the art will recognize that there are many possible variations and modifications which may be made in the exemplary embodiments while yet retaining many of the novel and advantageous features of this invention. Accordingly, it is intended that the following claims cover all such modifications and variations.

What is claimed is:

1. A process for producing micro- and nano-porous metallic structures comprising the following step:
    mixing silver and gold according to predetermined proportions to form a binary alloy;
    contacting said alloy with an electrolyte;
    applying an electrochemical potential to said alloy wherein said alloy acts as an anode until all or a portion of the silver is dissolved from the alloy leaving porous metal; and
    placing said porous metal into a furnace at an elevated temperature for a predetermined period of time, to anneal said porous metal.

2. The process of claim 1 wherein said silver forms 60–80% of said binary alloy and gold forms 40–20% of said alloy.

3. The process of claim 1 wherein said silver forms 74% and gold forms 26%, of said alloy.

4. The process of claim 1 wherein said electrolyte is perchloric acid or nitric acid.

5. The process of claim 4 wherein said perchloric acid is employed in a concentration of 0.01 M to 4 M.

6. The process of claim 4 wherein said perchloric acid is present in a concentration of 1 M.

7. The process of claim 1 wherein said electrochemical potential is 0.7 V to 1.4 V.

8. The process of claim 1 wherein said electrochemical potential is 1.1 V.

9. The process of claim 1 wherein said alloy anode is mechanically supported.

10. The process of claim 1 wherein said electrochemical potential is applied and maintained until the anodic current density drops below the level of 10 microamps-cm$^{-2}$.

11. The process of claim 1 wherein the temperature of said electrolyte is maintained at a temperature ranging from 10° C. to 90° C.

12. The process of claim 1 wherein said porous metal consists of greater than 99% gold.

13. The process of claim 2 wherein said elevated temperature ranges between 400° C.–800° C.

14. The process of claim 2 wherein said predetermined time interval ranges from two minutes to one hour.

15. The process of claim 2 wherein said time interval ranges between 5–30 minutes.

16. The process of claim 2 wherein said porous metal is placed into a rigid metal jacket cast to reduce physical distortion and warping of the porous metal.

17. The process of claim 16 further including increasing the furnace temperature from an initial ambient temperature, linearly at a rate of less than 10° C. min$^{-1}$ to a predetermined maximum temperature.

18. The process of claim 2 wherein said temperature is increased from an initial ambient temperature, linearly at a rate of less than 10° C. min$^{-1}$ to a predetermined maximum temperature, to reduce physical shape distortion and warping of the metal.

19. The process of claim 2 wherein the temperature of said electrolyte is maintained at 50°–90° C., for a predetermined period of time, for in-situ annealing.

20. The process of claim 2 wherein said silver is dissolved from only the surface of said binary alloy to a predetermined depth.

21. The process of claim 20 further including the following steps:
    (e) placing said porous metal into a furnace at an elevated temperature for a predetermined period of time, to anneal said porous metal;
    (f) placing the annealed porous metal into a corrosion cell and evacuating said cell;
    (g) introducing electrolyte into said evacuated cell, contacting the porous metal;
    (h) applying an electrochemical potential to said electrolyte wherein said metal acts as an anode until additional silver is dissolved from beneath the porous metal leaving fine porous metal at the interface of the annealed porous structure and undissolved metal;
    (i) placing said porous metal into a furnace at a lower temperature than the last annealing step for a predetermined period of time, to anneal said porous metal;
    (j) stopping the present process at this point or repeating steps (f)–(i) for a predetermined ("n") number of cycles to produce a porous metal of prescribed thickness with "n" number of step changes in porosity with depth from the surface of said porous metal.

22. The process of claim 2 further including the step of applying a tightly adhering material impermeable to said electrolyte, to selected areas of said binary alloy before contacting with said electrolyte, to prevent subsequent dissolution of silver from said covered areas, the undissolved areas providing support to the resulting porous metal.

23. The process of claims 2 further including the step of placing a metal macroscopic mesh on all or a portion of the surface of said porous metal to provide additional structural support.

24. The process of claim 2 further including the step of placing a metal macroscopic mesh on all or a portion of the surface of said annealed porous metal to provide additional structural support.

25. A porous metal structure comprising: a binary alloy substantially formed of gold with less than 1% silver, having substantially uniform and interconnected porosity, with pore sizes ranging from three nanometers to 10 micrometers.

26. The porous metal structure of claim 25 wherein said structure has a thickness ranging from 0.0001 to 10 mm.

27. The porous metal structure according to claim 25 wherein the volume fraction of porosity ranges from 60-80%.

28. The porous metal structure of claim 25 having an average pore area ranging from $6 \times 10^{-6}$ to 1.53 $\mu m^2$.

29. The porous metal structure of claim 25 wherein said pore size ranges from 0.003-1.25 $\mu m$.

30. The porous metal structure of claim 25 wherein the elastic Young's modulus ranges from 47-240 MPa.

31. The porous metal structure of claim 25 wherein the fracture stress ranges from 0.55 to 3.00 MPa.

32. The porous metal structure of claim 25 further including areas of non-porous metal which provide structural support.

33. The porous metal structure of claim 25 wherein the degree of porosity changes with depth in a step fashion from the surface of said structure.

34. A porous metal structure comprising:
a binary alloy substantially formed of gold with less than 1% silver, having substantially uniform and interconnected porosity, said alloy being annealed and having pore sizes ranging from three nanometers to 10 micrometers.

35. The porous metal structure of claim 34 having dimensional stability.

36. A porous metal structure comprising:
a binary alloy substantially formed of gold with less than 1% silver, having substantially uniform and interconnected porosity, the degree of porosity changing with depth in a step fashion from the surface of said structure and having pore sizes ranging from three nanometers to 10 micrometers.

* * * * *